(12) United States Patent
Dilsky et al.

(10) Patent No.: US 11,124,855 B2
(45) Date of Patent: Sep. 21, 2021

(54) BINDER COMPOSITION FOR THE AGGLOMERATION OF FINE MINERALS AND PELLETIZING PROCESS

(71) Applicants: Clariant International Ltd., Muttenz (CH); Clariant S.A., Sao Paulo (BR)

(72) Inventors: Stefan Dilsky, Gerbrunn (DE); Carlos Augusto Blasques Tooge, Sao Paulo (BR); Nilson Mar Bartalini, Sao Paulo (BR); Almir T. Santos, Santos (BR); Wagner Claudio Da Silva, São Paulo (BR); Monica Speck Cassola, Sao Paulo (BR); Jorge Antonio Arias Medina, Forest Hill (AU)

(73) Assignee: Clariant International Ltd., Muttenz (CH)

( * ) Notice: Subject to any disclaimer, the term of this patent is extended or adjusted under 35 U.S.C. 154(b) by 15 days.

(21) Appl. No.: 16/370,655

(22) Filed: Mar. 29, 2019

(65) Prior Publication Data
US 2019/0226050 A1    Jul. 25, 2019

Related U.S. Application Data

(62) Division of application No. 15/962,337, filed on Apr. 25, 2018, now abandoned, which is a division of application No. 14/233,660, filed as application No. PCT/EP2012/002785 on Jul. 3, 2012, now abandoned.

(30) Foreign Application Priority Data

Jul. 21, 2011   (EP) ..................... 11005970

(51) Int. Cl.
*C22B 1/244*   (2006.01)
*C22B 1/243*   (2006.01)

(52) U.S. Cl.
CPC .............. *C22B 1/244* (2013.01); *C22B 1/243* (2013.01)

(58) Field of Classification Search
CPC ................................ C22B 1/244; C22B 1/243
See application file for complete search history.

(56) References Cited

U.S. PATENT DOCUMENTS

| | | | |
|---|---|---|---|
| 2,775,566 A | 12/1956 | Crowley | |
| 3,644,113 A | 2/1972 | Lang | |
| 3,860,414 A | 1/1975 | Lang | |
| 4,684,549 A | 8/1987 | Allen | |
| 4,728,537 A | 3/1988 | Allen | |
| 4,767,449 A | 8/1988 | Rosen | |
| 4,802,914 A | 2/1989 | Rosen | |
| 5,002,607 A * | 3/1991 | Flesher | C22B 1/2406 75/767 |
| 5,294,250 A | 3/1994 | Panigraphy | |
| 5,306,327 A | 4/1994 | Dingeman | |
| 5,698,007 A | 12/1997 | Schmitt | |
| 6,113,844 A | 9/2000 | Neale | |
| 6,384,126 B1 | 5/2002 | Pirtle | |
| 6,657,017 B2 | 12/2003 | Shiming | |
| 2002/0035188 A1 | 3/2002 | Steeghs | |
| 2002/0035224 A1 | 3/2002 | Yamaguchi | |
| 2003/0004246 A1 | 1/2003 | Wache | |
| 2005/0223937 A1 | 10/2005 | Schmitt | |
| 2008/0029460 A1 | 2/2008 | Wright | |
| 2012/0052316 A1 | 3/2012 | Evstatieva | |
| 2014/0243552 A1 | 8/2014 | Ogasawara | |

FOREIGN PATENT DOCUMENTS

| | | |
|---|---|---|
| CA | 902435 | 6/1972 |
| CA | 2117007 | 9/1994 |
| CN | 101008046 | 8/2007 |
| CN | 101157985 | 4/2008 |
| EP | 0225171 | 6/1987 |
| EP | 0288150 | 10/1988 |
| EP | 0376713 | 7/1990 |
| EP | 0413592 | 2/1991 |
| EP | 0413603 | 2/1991 |
| EP | 1367141 | 12/2003 |
| EP | 1462507 | 9/2004 |
| EP | 1541700 | 6/2005 |
| JP | S5950129 | 3/1984 |

(Continued)

OTHER PUBLICATIONS

English Abstract for JP2003-155524, dated May 30, 2003. 1 page.

(Continued)

*Primary Examiner* — John E Uselding
(74) *Attorney, Agent, or Firm* — Tod A. Waldrop

(57) ABSTRACT

A process for pelletizing particles of a fine mineral ore, the process comprises the steps of
a) mixing the particles of a fine mineral ore with a binder composition to obtain a pellet feed,
b) forming the pellet feed into balls,
c) drying the balls to form dried balls,
d) preheating the dried balls at 60 to 105° C. until constant weight to form preheated balls,
e) subsequently heating the preheated balls to a temperature of 1200° C. to 1400° C. to obtain pellets,
wherein the binder composition comprises
 a) at least one colloid agent which exerts a cohesive force on the particles of a fine mineral ore forming the pellets, and
 b) at least one synthetic polymer which disperses the particles of a fine mineral ore in the pellets,
wherein the synthetic polymer is a maleic acid/acrylic acid or a maleic acid/methacrylic acid copolymer.

11 Claims, No Drawings

(56) References Cited

FOREIGN PATENT DOCUMENTS

| JP | S61061630 | 3/1986 |
| JP | H036334 | 1/1991 |
| JP | 2003155524 | 5/2003 |
| WO | 9116463 | 10/1991 |
| WO | 2007069857 | 6/2007 |

OTHER PUBLICATIONS

English Abstract for JPH036334, dated Jan. 11, 1991. 1 page.
English Abstract for JPS5950129, dated Mar. 23, 1984. 2 pages.
Haydn H. Murray, 1991, "Overview—clay mineral applications", in Applied Clay Science, 5 (1991) pp. 379-395.
International Search Report for PCT/EP2012/002785, dated Dec. 20, 2012. 3 pages.
Machine Translation of CN101157985, Apr. 9, 2008. 4 pages.
Nicholson, John W. Metal Salts Interaction with Acrylic Acid-Maleic Acid Copolymer: An Infrared Spectroscopic Study. JOurnal of Applied Polymer Science, vol. 78, 1680-1684. (Year: 2000).
Notice of Opposition against European Patent No. 2 734 653, dated Sep. 8, 2016. 27 pages.
R. Sah and S.K. Dutta, 2010, "Effects of Binder on the Properties of Iron Ore-Coal Composite Pellets", in Mineral Processing and Extractive Metallurgy Review, vol. 31, p. 73-85.
T.C. Eisele and S.K. Kawatra, 2003, "A review of binders in iron ore peptization", in Mineral Processing and Extractive Metallurgy Review, vol. 24, p. 1-90.
English Abstract for CN101008046, dated Aug. 2007, 1 page.

\* cited by examiner

BINDER COMPOSITION FOR THE AGGLOMERATION OF FINE MINERALS AND PELLETIZING PROCESS

FIELD OF THE INVENTION

Pelletization is the standard method of agglomerating used to turn fine minerals fractions, mainly of iron ore, into an adequate product (pellet) to be fed to the blast furnace and to the direct reduction reactors. The present invention describes the use of a binder composition comprising a colloid agent and a synthetic polymer. The compressive strength of the green, dried and fired pellets was evaluated and the result shows better performance than the compounds used individually. The invention also provides for a pelletizing process using the binder composition.

BACKGROUND OF THE INVENTION

In order to become commercially usable, low grade ores are generally concentrated and pelletized prior to the reduction processing in a blast furnace. It is common in the mining industry to produce ore agglomerates or to pelletize finely ground mineral ore. Considering iron ore concentrate, the feed to a blast furnace should form a permeable bed of material, permitting gas flow through it uniformly at a high rate.

Powdered iron ore concentrates containing fine particles are not suitable as feed because fines (i.e. fine mineral particles having a particle size from 0.01 to 0.3 mm as e.g. measured by sieves) tend to pack into a nonpermeable bed. In addition, the fine particles are likely to be carried away as dust by the high gas flow rates into the blast furnace and into the direction of the reduction reactor. The powdered ore must therefore be agglomerated into larger particles that will improve permeability of the furnace feed, increase the rate of reduction, and reduce the amount of material blown out of the furnace as dust.

Pelletizing is an agglomeration technique in which the powdered ore is first formed into a "green" pellet or ball, which is then dried in a first separate step and hardened in a second separate step, both usually by heating. Green pellets are made by combining moist ore with a binder and rolling it into balls using either a pelletizing disc or a pelletizing drum. The pellets are then dried, preheated, and finally fired to more than 1000° C., preferably 1200 to 1400° C., particularly 1350° C. to harden them by sintering. This temperature is lower than the melting point of iron oxides, and the pellets harden by recrystallization of hydrated fines ore. The fines ores were dispersed by the binder system, between the particle grain boundaries.

The pelletization process requires a binder to be added to the ore in order to work properly. The selection of the proper binder type and dosage is of critical importance in producing high quality pellets. Binders accomplish very important functions in iron ore pelletization.

The binder makes the moist ore plastic, so that it will nucleate seeds that grow at a controlled rate into well-formed pellets. During drying, the binder holds the particles in the agglomerates together while the water is removed and continues to bind them together until the pellet is burned to sinter.

The suitability of a binder is determined by how well it can achieve these functions while at the same time not causing contamination of the ore or sintering problems.

The pellet strength is dependent on the type of bonding produced by the binder. The bonding type can be classified as capillary forces, van der Waals bonding and adhesional and cohesional forces. Capillary forces are strong but are not sufficient for imparting sufficient pellet strength to finished pellets. Van der Waals bonding is very weak and only of minor importance for imparting sufficient pellet strength to finished pellets.

It is therefore necessary to use binders that will exert adhesional or cohesional forces for imparting sufficient pellet strength to finished pellets. Adhesional or cohesional forces will also be referred to as cohesive force in this specification. The adhesive and cohesive forces occur between solid particles when moisture (water) is present. Besides water the presence of a binding agent is necessary in order to maintain the adhesive and cohesive forces also after firing the pellets at temperatures above 1000° C. Such binders are for example clay minerals or calcium compounds, which ones bind the solid particles providing the strength necessary to forming the pellets.

Clay minerals are among the most frequently used binders in iron ore pelletization. The main advantage of clay minerals is their good, wettability, their great adhesive and cohesive force, which provides sufficient mechanical stability of the finished pellets, as well as their thermal stability. The main disadvantage of clays and other binders based on silicate minerals is that they increase silica content in the finished pellet. This has prompted continuing interest in developing binders that contain less or no silica.

Calcium compounds may be used as binders, as well as clay minerals, in iron ore pelletization. Calcium binders have the advantage to increase the mechanical stability of the pellets by cohesive force and present a positive metallurgic effect. The CaO (calcium oxide) reacts with water to give hydrated lime in a reaction called hydration.

This reaction is exothermic and the volume of the hydrated lime is approximately three times higher than the CaO volume. The process of hydration must be completed before mixing with the ore. Otherwise, if calcium oxide is hydrated during the pelletization process, it will induce damage to the pellet structure due to the volume expansion.

Organic binders have the advantages that they are highly effective, can be specifically designed for binding particular types of particles, have highly reproducible characteristics, and do not increase the silica content. Investigations show that the improvement in natural adhesion between the powder particles caused by the organic binders is attributed to its increasing effect on the wettability on the surface of concentrates, besides an increase in the dispersion of ore fines. Organic binders are dispersants for fines. The increase of the dispersion degree of fines when organic binders are used entails an increase in the pellet strength by filling the empty spaces between the solid particles which form the pellets with a better finishing without dust from fines on the particles' and pellets' surface. Organic binders also burn out during sintering thus causing an increase in the micro porosity of the finished pellets.

U.S. Pat. No. 4,684,549 discloses a process in which iron ore pellets are made by addition of binder comprising organic polymer or copolymer of sodium acrylate and acrylamide.

U.S. Pat. No. 4,728,537 discloses organic polymer binders like cationic polymers from diallyl dimethyl ammonium chloride and quaternised dialkylaminoalkyl (methyl) acrylates and quaternised dialkylaminoalkyl (methyl) acrylamides.

U.S. Pat. No. 4,767,449 relates to a process of agglomerating, comprising a two component binder system, a first component being a binding polymer and a second one being clay. The polymer or copolymers is a derivative from monomer units of acrylamide, sodium acrylate, vinyl acetate and poly (ethylene oxide). The polymer can also be a polysaccharide, e.g. carboxymethyl cellulose, guar gum and hydroxyethyl cellulose.

U.S. Pat. No. 5,294,250 discloses a self-fluxing clay free binder composition comprising in admixture of a carrier selected from the group of synthetic or natural magnesium and/or calcium mineral (calcite, olivine, magnesite and dolomite) and one organic enhancer consisting of a natural polysaccharide of high viscosity (guar gum).

U.S. Pat. No. 5,306,327 discloses a binder for pelletizing particulate minerals. The binder comprises (1) modified native starch and (2) a water dispersible polymer. The polymer includes lignosulfonates, acrylic polymers, vinyl polymer, cellulose derivates, natural gums, guar gums and pectin.

U.S. Pat. No. 5,698,007 discloses a process of agglomerating particulate material in two steps: (1) pretreating the mineral with a binder source of hydroxide ions, and (2) mixing the pretreated material with a water-soluble polymer. The source of hydroxide ions can be sodium, calcium, barium and magnesium hydroxide. The water soluble polymer include guar, guar derivatives, carboxymethyl guar, hydroxypropyl guar, carboxymethylhydroxypropyl guar, modified starch, starch derivatives, carboxymethyl starch, pregelatinized starch, alginates, pectins, polyacrylamides and derivatives thereof, polyacrylates and copolymers thereof, polyethyleneoxides, cellulose derivatives, carboxymethyl cellulose, hydroxyethyl cellulose, carboxymethylhydroxyethyl cellulose, methylhydroxyethyl cellulose, carboxymethyldihydroxypropyl cellulose, xanthan gum, dairy wastes, wood related products and lignin.

US-2002/0035188 discloses a method for agglomerating particulate material comprising two steps: (A) rendering the surface of the particulate material as sodium citrate, acrylate dispersants, other salts of mono-, multi carboxylic acids, phosphates, non-ionic water soluble polymers, guar, starch, non-ionic polyacrylamideslacrylates, non-ionic celluloses, methyl/ethyl cellulose, sodium carbonate, caustic, tetrasodium EDTA, ether sequestering agents, oxalates, or mixture thereof; (B) adding to the particulate material a binding effective amount of a polymeric binder as guar, guar derivatives, carboxymethyl guar, hydroxypropyl guar, carboxymethylhydroxypropyl guar, modified starch, starch derivatives, carboxymethyl starch, pregelatinized starch, alginates, pectins, polyacrylamides and derivatives thereof, polyacrylates and copolymers thereof, polyethyleneoxides, cellulose derivatives, and, salts thereof, carboxymethyl cellulose, hydroxyethyl cellulose, carboxymethylhydroxyethyl cellulose, methylhydroxyethylcellulose, carboxymethyldihydroxypropyl cellulose, xanthan gum, dairy wastes, wood related products, lignin, or mixture thereof.

EP-1387141 A1 discloses a method of carrying out a granulation treatment on raw materials for iron and steel production using a polymer from the group: polyacrylic acid, polyacrylic salt, polyalkylene glycol chain, a β-naphthalene sulfonate formalin condensate, a melamine sulfonate formalin condensate, a poly-aromatic amino sulfonic acid, denatured lignin sulfonate, polymer with a carboxyl group and/or its salts.

This invention seeks to lower the required amount of silica compounds when sintering finely powdered iron ore. This invention further seeks to reduce the required amount of hydrated lime when sintering finely powdered iron ore.

DETAILED DESCRIPTION OF THE INVENTION

In a first aspect, the present invention provides a binder composition for pelletization of fine mineral particles comprising
a) at least one colloid agent which exerts a cohesive force on the mineral particles forming the pellets, and
b) at least one synthetic polymer which disperses mineral particles in the pellets.

In a second aspect, the present invention provides a process or pelletizing fine mineral ores, the process comprising the steps of
a) mixing the fine mineral ore with a binder composition as described above to obtain a pellet feed,
b) forming the pellet feed into balls (green pellets),
c) drying the balls,
d) preheating the dried balls at 60 to 105° C. until constant weight,
e) subsequently heat the preheated balls to a temperature of 1200° C. to 1400° C. to obtain pellets.

In a third aspect, the present invention provides a mineral composition, comprising a binder composition as described above, and a mineral ore selected from the group consisting of iron ore, taconite, magnetite, hematite, limonite, goethite, siderite, franklinite, pyrite, chalcopyrite, chromite, ilmenite, chrome, copper, nickel, zinc, lead, uranium, barium, phosphate rock, talc, dolomite, limestone, potassium sulfate, potassium chloride, double sulfate of potassium and magnesium, magnesium oxide, calcium phosphate, carbon black, coal, coal fines, calcite, quartz or any mixture thereof.

In a fourth aspect, the present invention provides the use of a binder compound as described above as an additive in pelletizing mineral ores.

The present invention describes a method to agglomerate a particulate minerals composition. The method includes mixing the particulate mineral with a two component binder system. The first component of the binder system is a colloid agent to form agglomerates of the mineral particles. The second component of the system is a synthetic polymer which is a dispersant for mineral particles. An increase in performance is obtained by adding the colloid agent together with the polymer providing a synergistic effect in the pelletization process, giving pellets with superior dry and green compressive strength compared with the colloid agent or polymer used individually.

The expression "constant weight" as used herein with respect to the preheating of the dried balls means that preheating is done for a sufficient time so that the dried balls will essentially reach a weight which essentially no more changes with time under the preheating conditions. A constant weight is reached when compounds which are volatile under the preheating conditions are vaporized from the dried and preheated balls.

The particulate mineral to be agglomerated in accordance with this present invention may be a finely ground mineral, e.g. in powder, dust, chip, or other particulate form. Metallic minerals or ores to be agglomerated include ores of iron, taconite, magnetite, hematite, limonite, goethite, siderite, franklinite, pyrite, chalcopyrite, chromite, ilmenite, chrome, copper, nickel, zinc, lead, uranium, niobium, cassiterite, rutile, borium, or mixtures thereof.

Non-metallic minerals or ores also can be agglomerated in accordance with the invention including phosphate rock, talc, dolomite, limestone, potassium sulfate, potassium chloride, double sulfate of potassium and magnesium, magnesium oxide, calcium phosphate, carbon black, coal, coal fines, calcite, quartz or mixtures thereof.

The colloid agents applied in the present invention preferably comprises a least one compound selected from the group consisting of calcium compounds, magnesium compounds and clay minerals. The calcium or magnesium compound is preferably selected from calcium oxide, calcium hydroxide, calcium carbonate, calcium and magnesium oxide, calcium and magnesium hydroxide. The clay mineral is preferably selected from phyllossilicates including the group of Serpentine and Kaolinite, Talc and Pyrophyllite, Micas (phlogopite, muscovite, and biotite), Illite (hydrous mica), Vermiculite and Smectites.

Whether a colloid agent exerts a cohesive force on the mineral particles forming the pellets or not can be determined by measuring the compressive strength according to ASTM standard method E 382, "Standard Test Method for Determination of Crushing Strength of Iron Ore Pellets" (ASTM 1997). For green pellets, ten of them were selected randomly, having diameters ranging from 12.5 mm to 10.0 mm. Each pellet was submitted individually to a compressive strength measurement by pressing between parallel plates of an UHL-KRATOS equipment. The test is destructive and each pellet has its compressive strength measured and registered on the scale of the dynamometer at the time of its rupture. The result is the arithmetic mean from ten measurements and expressed in kgf/pellets. The same procedure is used for dry pellets. Dry pellets have to be cooled to room temperature before starting the test. A colloid agent is considered to exert a cohesive force on the mineral particles forming the pellets if the compressive strength measured according to this method increases when the colloid agent is present compared to the compressive strength measured without the colloid agent.

The synthetic polymer is a compound capable of dispersing the mineral particles. It particularly will disperse the fine ore particles between the coarse ore particles that remain as grain boundaries. The expression "disperse" shall mean that the fine particles are distributed more evenly among the coarse particles, and less separation between fine and coarse particles occurs. In a preferred embodiment, there are 4 groups of polymers which will perform in this capacity:

a) Condensation products of at least one aldehyde and at least one compound containing two or more $NH_2$ groups. A compound containing two or more $NH_2$ groups preferably may be represented by the formula

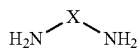

wherein

X means an aliphatic, straight chain, branched or cyclic residue containing 1-10 carbon atoms which may also contain oxygen or nitrogen atoms. Examples for such a compound containing two or more $NH_2$ groups are urea, 1,6-hexandiamin, diethylene triamine, 1,2-cyclohexanediamine. Alternatively, X means an aromatic residue containing 1-10 carbon atoms which may also contain oxygen or nitrogen atoms. X may contain one or more amino groups. Examples for such a compound containing two or more $NH_2$ groups are melamine, 1,2-diaminobenzene, 1,8-diaminonaphthalene.

The aldehyde preferably is represented by the formula

wherein

R means H or an aliphatic hydrocarbyl residue containing 1-4 carbon atoms which may also contain oxygen. Examples for such an aldehyde are formaldehyde, acetaldehyde, propanale, pivaldehyde, glyoxal.

b) Copolymers obtained via a radical reaction of an unsaturated monomer with an acrylic acid derivative The unsaturated monomer preferably is represented by the formula

wherein

Y is hydrogen, OH or a residue containing 1 to 10 carbon atoms and at least one oxygen atom, one nitrogen atom or one aromatic moiety. Particularly, Y is selected from residues of the formula —OR wherein R means H, —C(=O)H, —C(O)CH$_3$, C(=O)CH$_2$CH$_3$, C(=O)CH$_2$CH$_2$CH3, C(=O)CH(CH$_3$)$_2$, C(=O)C(CH$_3$)$_3$. Examples for such compounds are vinylalcohol, vinylacetate, and vinylformiate. Alternatively, if Y is a nitrogen containing residue, examples for such compounds are vinylpyrrolidone and dimethyldiallylammoniumchloride. In case that Y contains an aromatic moiety, the compound may be styrene. In case of Y=OH the monomer unit is preferably made by saponification.

The acrylic acid derivative preferably is represented by the formula

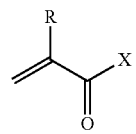

wherein

R is H or $CH_3$ and X is OH, $NH_2$, OR', NHR", NR'"R"", R'-R"" being independently from each other aliphatic hydrocarbon groups having 1 to 6 carbon atoms. Examples for such compounds are acrylic acid, methacrylic acid, acrylamicle, methacrylamide, N,N-dimethylacrylamide, N N-dimethylmethacrylamide, ammonium acryloyldimethyltaurate c) Maleic acid-acrylic acid and maleic acid-methacrylic acid copolymers d) Homopolymers obtained by radical polymerization of an olefinically unsaturated monomer comprising at least one carboxylic group. The monomer preferably comprises 3 to 10 carbon atoms.

Examples for such compounds are the homopolymers of acrylic acid, methacrylic acid, vinyl acetate, vinylformiate, vinylpropionate, maleic acid, maleic acid anhydride, fumaric acid.

The synthetic polymer is preferably selected from, the group consisting of melamine-urea-formaldehyde resin, urea-formaldehyde resin, melamine-formaldehyde resin, melamine-glyoxal-formaldehyde resin, styrene-acrylic copolymer, vinyl-acrylic copolymer, vinyl acetate-acrylic copolymer, vinyl acetate polymer, poly (maleic anhydride), acrylic-maleic copolymer, diallyl dimethyl ammonium chloride-acrylamide copolymer, polycarboxylate, sodium salt of poly-naphthalene sulfonic acid, ammonium acryloyldimethyltaurate-vinylpyrrolidone copolymer, Dimethylamine-epichlorohydrin copolymer or mixtures thereof. The synthetic polymer may be added as solid. The synthetic polymer may also be added in solution with any suitable solvent. The preferred solvent is water.

With respect to all aforementioned polymers, their preferred weight average molecular weight is in the range between 500 and 500,000, particularly between 700 and 100,000, especially 800 and 20,000 g/mol, determined by GPC against polystyrene.

In one embodiment, the object of the invention is a binder composition for pelletization of fine mineral particles comprising A) at least one compound selected from the group consisting of calcium compounds, magnesium compounds and clay minerals, and B) at least one synthetic polymer selected from the group consisting of
a) Condensation products of at least one aldehyde and at least one compound containing two or more $NH_2$ groups,
b) Copolymers obtained via a radical reaction of an unsaturated monomer with an acrylic acid derivative,
c) Maleic acid-acrylic acid copolymers, and
d) Homopolymers obtained via a radical reaction of an unsaturated carboxylic group bearing monomer.

A series of commercially available synthetic polymers useful in the present invention is marketed by Clariant S.A. Sao Paulo-Brazil, under the Arkomon® trademark.

Other substances may be added to the binder composition of the present invention. For example, in iron ore pelletizing operations, small amounts of coal and calcite, may be added to improve metallurgical process as fuel and slag forming component when the pellets are fired.

The effective amount of colloid agent as well as synthetic polymer depend upon the type of particulate material to be agglomerated or pelletized, the moisture content of the particulate material, particle size, the agglomeration equipment utilized, and the desired properties of the final product, dry and green comprehensive strength, drop number, pellet size and smoothness.

The binder effective amount of colloid agent will typically be in the range of about 0.001% to 0.6% by weight, based on the dry weight of the mixture of particulate material, i.e. the mineral ore without additives. Preferably, the colloid agent is present in a range of between 0.002% to 0.4% by weight.

The binder effective amounts of synthetic polymer will typically be in the range of about 0.001% to 1% by weight based on the dry weight of the mixture of particulate material, i.e. the mineral ore without additives. Preferably, the synthetic polymer is present in a range of between 0.004% to 0.15% by weight.

The particulate material may be agglomerated into pellets by rotating the concentrated ore powder in a drum or disc with a binder and water, followed by drying, preheating and firing.

EXAMPLES

First of all the sample ore was homogenized by the method of elongated cell or other method more adequate and samples of about 5 kg were taken. The process started by adding 5 kg (calculated as dry weight) of iron ore concentrated into a mixer manufactured by HOBART company, model A-120T, with capacity to 10 kg, and the stirrer was turn on.

The binder system (colloid additive and synthetic polymer) was slowly added over the top to the concentrate while stirring and mixed for 10 minutes. The colloid additive was added in a dry form and the synthetic polymer was added in an aqueous solution. The resulting mixture of particulate material and binder system (colloid additive and synthetic polymer) was called pellet feed. The amount of binders added is given in kg per ton of dry mass of fine minerals.

The pelletizing has the following requirements. First of all, the ore being pelletized should have a sufficiently fine particle size distribution, second, sufficient moisture to make the ore sticky enough to pelletize but not so much moisture that the ore becomes "muddy". Finally, the binder system is necessary to hold the particle grains together during the whole process.

The pellet feed was added to the pelletizing disc or drum manufactured by CDC company model PP80 with 0.6 meter of diameter with rotation around 20 rpm and inclination 45 degree, to form "green" pellets. Green pellets are made by combining moist ore with the binder system and rolling it into balls using the pelleting disc. If necessary, the moisture content can be adjusted by slowly adding water. The size distribution from the green pellets after the test may be between 8 to 12 mm. The pellets were removed from the pelleting disc, then dried, preheated and finally heated to approximately 1300° C. to harden them.

For evaluating the pellets the compressive strength was measured on a universal testing machine. The pellets were pressed axially directed pushing forces and the limit of compressive strength is reached when the pellets are crushed.

The dispersion degree of mineral particles is described in ZHOU Y., HU Y., and WANG Y., Effect of metallic ions on dispersibility of fine diaspora, Transactions of Nonferrous Metals Society of China, V. 21, p 1166-1171, 2011, also by MARISA M, and LAURINDO S. L. F., Influence of pump aggregation state at flotation of quartz, apatite and calcite, Jornal Escola de Minas, V 56, p 55-60, 2006.

For the purpose of this specification, the dispersion degree of mineral particles is determined as follows, 2.5 g mineral samples are added into a plastic beaker containing 50 mL water, and the suspension is agitated for 5 min using a magnetic stirrer and is then transferred to a glass sedimentation cylinder. The cylinder is turned up and down 20 times, and rested for 7 min. The liquid (upper fraction) above the sediment is siphoned out. The sediment ($m_{sed}$) and the upper fractions ($m_{susp}$) are collected, dried and weighed. The dispersion degree (D) is calculated as $D=m_{susp}/(m_{susp}+m_{sed})\times 100\%$. The diameter, height and volume of the sedimentation glass tube are 4.0 cm, 33 cm and 250 respectively. The measurement is done at ambient temperature.

Example 1

The example below shows iron ore VVC, pelletized using hydrated lime as colloid agent with and without the addition of synthetic acrylic acid-maleic acid copolymer (Fongrascale HOE®). Table 1 clearly shows that the amount of calcium hydroxide, necessary to achieve the same compressive strength decreased when the synthetic polymer was added.

TABLE 1

Iron ore VVC pelletized with hydrated lime and the acrylic-maleic copolymer Fongrascale ® HOE

| | Binder Additive (kg/ton) | | Compressive strength (kgf/pellets) | |
|---|---|---|---|---|
| Test | Hydrated Lime | Fongrascale ® HOE | Green | Dried (105° C.) |
| 1 (comp.) | 27.0 | — | 1.37 | 2.21 |
| 2 (comp.) | — | 0.50 | 1.60 | 2.15 |
| 3 | 21.0 | 0.50 | 1.30 | 2.60 |

Example 2

The example below shows iron ore VVC, pelletized using hydrated lime as colloid agent with and without the addition of synthetic melamine-formaldehyde copolymer (Dismulgan® V 3377). Table 2 clearly shows that the amount of calcium hydroxide, necessary to achieve the same compressive strength decreased when the synthetic polymer was added.

TABLE 2

Iron ore VVC pelletized with hydrated lime and the melamine-formaldehyde copolymer Dismulgan ® V 3377

| | Binder Additive (kg/ton) | | Compressive strength (kgf/pellets) | |
|---|---|---|---|---|
| Test | Hydrated Lime | Dismulgan ® V 3377 | Green | Dried (105° C.) |
| 1 (comp.) | 27.0 | — | 1.37 | 2.21 |
| 2 | 21.0 | 0.50 | 1.24 | 2.50 |
| 3 | 13.0 | 0.50 | 1.40 | 2.31 |

Example 3

The example below shows iron ore VVC, pelletized using hydrated lime as colloid agent with and without the addition of synthetic polycarboxylate. Table 4 clearly shows that the amount of calcium hydroxide necessary to achieve the same comprehensive strength decreased when the synthetic polymer was added.

TABLE 3

Iron ore VVC pelletized with hydrated lime and polycarboxylate

| | Binder Additive (kg/ton) | | Compressive strength (kgf/pellets) | |
|---|---|---|---|---|
| Test | Hydrated Lime | Polycarboxylate | Green | Dried (105° C.) |
| 1 (comp.) | 27.0 | — | 1.37 | 2.21 |
| 2 | 21.0 | 0.50 | 1.35 | 2.60 |
| 3 | 13.0 | 0.50 | 1.61 | 2.19 |

Example 4

The example below shows iron ore VSB, pelletized using smectite as colloid agent with and without the addition of synthetic acrylic-maleic copolymer (Fongrascale® HOE). Table 6 clearly shows that the amount of calcium hydroxide necessary to achieve the same comprehensive strength decreased when the synthetic polymer was added.

TABLE 4

Iron ore VSB pelletized with smectite and the acrylic-maleic copolymer Fongrascale ® HOE

| | Binder Additive (kg/ton) | | Compressive strength (kgf/pellets) | |
|---|---|---|---|---|
| Test | Smectite | Fongrascale ® HOE | Green | Dried (105° C.) |
| 1 (comp.) | 6.0 | — | 1.46 | 3.03 |
| 2 (comp.) | 0.0 | 0.50 | 2.50 | 3.07 |
| 3 (comp.) | 0.0 | 0.25 | 2.61 | 2.88 |
| 4 | 1.0 | 0.50 | 1.50 | 6.59 |
| 5 | 1.0 | 0.25 | 1.44 | 4.01 |

Example 5

The example below shows iron ore VSB, pelletized using smectite as colloid agent with and without the addition of synthetic styrene-acrylic copolymer (Mowilith® 6138). Table 7 clearly shows that the amount of calcium hydroxide necessary to achieve the same comprehensive strength decreased when the synthetic polymer was added.

TABLE 5

Iron ore VSB pelletized with smectite and the styrene-acrylic copolymer Mowilith ® 6138

| | Binder Additive (kg/ton) | | Compressive strength (kgf/pellets) | |
|---|---|---|---|---|
| Test | Smectite | Mowilith ® 6138 | Green | Dried (105° C.) |
| 1 (comp.) | 6.0 | — | 1.46 | 3.03 |
| 2 | 1.0 | 0.50 | 1.55 | 2.90 |

Example 6

The example below shows the dispersion degree of the mineral particles with and without the presence of the colloid agent and/or the synthetic polymer. Table 6 shows that the dispersion degree of the iron ore in the presence of the synthetic acrylic-maleic copolymer (Fongrascale® HOE) increased compared to when just hydrated lime was added.

TABLE 6

Iron ore dispersion degree with hydrated lime and acrylic-maleic copolymer.

| | Binder Additive (kg/ton) | | Dispersion degree |
|---|---|---|---|
| Test | Hydrated Lime | Fongrascale ® HOE | (%) |
| 1 | — | — | 4.5 |
| 2 | 28 | — | 4.5 |
| 3 | 21 | 0.5 | 5.2 |

Example 7

The example below shows the dispersion degree of the mineral particles pure and in the presence of the colloid agent and/or the synthetic polymer. Table 7 shows that the dispersion degree of the iron ore in the presence of the synthetic acrylic-maleic copolymer (Fongrascale® HOE) increased compared to when just smectite was added.

TABLE 7

Iron ore dispersion degree with smectite and acrylic-maleic copolymer.

| Test | Binder Additive (kg/ton) Smectite | Fongrascale ® HOE | Dispersion degree (%) |
|---|---|---|---|
| 1 | — | — | 4.5 |
| 2 | 6 | — | 6.4 |
| 3 | 1 | 0.25 | 8.8 |
| 4 | 1 | 0.50 | 11.2 |

The invention claimed is:

1. A process for pelletizing particles of a fine mineral ore, the process comprises the steps of
   a) mixing the particles of a fine mineral ore with a binder composition to obtain a pellet feed,
   b) forming the pellet feed into balls,
   c) drying the balls to form dried balls,
   d) preheating the dried balls at 60 to 105° C. until constant weight to form preheated balls,
   e) subsequently heating the preheated balls to a temperature of 1200° C. to 1400° C. to obtain pellets,
   wherein the binder composition comprises
      a) at least one colloid agent which exerts a cohesive force on the particles of a fine mineral ore forming the pellets, and
      b) at least one synthetic polymer which disperses the particles of a fine mineral ore in the pellets,
   wherein the synthetic polymer is a maleic acid/acrylic acid or a maleic acid/methacrylic acid copolymer.

2. The process of claim 1, wherein the colloid agent is selected from the group consisting of calcium compounds, magnesium compounds, clay minerals and mixtures thereof.

3. The process of claim 2, wherein the calcium or magnesium compound is selected from the group consisting of calcium oxide, hydrated lime, calcium carbonate, calcium oxide, magnesium oxide, calcium hydroxide, magnesium hydroxide and mixtures thereof.

4. The process of claim 2, wherein the clay mineral is selected from the group consisting of phyllosilicates and mixtures thereof.

5. The process of claim 3, wherein the clay mineral is selected from the group consisting of Serpentine, Kaolinite, Talc, Pyrophyllite, Micas, Vermiculite, Smectites and mixtures thereof.

6. The process of claim 1, wherein the synthetic polymer has a weight average molecular weight in the range between 500 and 500.000 g/mol, determined by GPC against polystyrene.

7. The process of claim 1, wherein the colloid agent is present in a weight range of from 0.001% to 0.6% by weight of mineral ore.

8. The process of claim 7, wherein the weight range is from 0.02% to 0.4% by weight.

9. The process of claim 1, wherein the synthetic polymer is present in a weight range of from 0.01% to 1% by weight of mineral ore.

10. The process of claim 9, wherein the weight range is from 0.05% to 0.6% by weight.

11. The process of claim 3, wherein the clay mineral is selected from the group consisting of phlogopite, muscovite, and biotite, hydrous mica and mixtures thereof.

* * * * *